Patented Jan. 15, 1952

2,582,918

UNITED STATES PATENT OFFICE 2,582,918

DEHYDROISOANDROSTERYL MERCAPTAN AND PROCESS

Seymour Bernstein and Karl J. Sax, Pearl River, N. Y., assignors to American Cyanamid Company, New York, N. Y., a corporation of Maine No Drawing. Application December 8, 1949, Serial No. 131,936

3 Claims. (Cl. 260—397.3)

This invention relates to dehydroisoandrosteryl mercaptan, its esters and methods of preparing the same.

The compound, dehydroisoandrosteryl mercaptan, has the following structural formula:

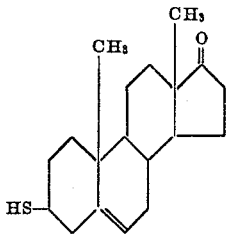

This compound and its esters are white crystalline solids. They are in general soluble in organic solvents such as chloroform or benzene and are insoluble in water.

The reaction to prepare the compounds of the present invention may be carried out by dissolving dehydroisoandrosteryl isothiuronium p-toluenesulfonate in a water miscible solvent in the presence of an alkaline substance. The mixture is then heated until the reaction is complete. The product may be recovered as dehydroisoandrosteryl mercaptan itself or as an ester thereof, for example, by treating with acetic anhydride and recovering the dehydroisoandrosteryl thioacetate. It can also be recovered in the form of other thioesters, as shown hereinafter in the examples.

The intermediate, namely, dehydroisoandrosteryl isothiuronium p-toluenesulfonate, used in the present process, can be obtained by heating dehydroisoandrosteryl p-toluenesulfonate with thiourea and pyridine or other tertiary amines.

The reaction of the present invention is preferably carried out in a water miscible solvent such as methanol, ethanol, propanol, ethylene glycol, ethylene glycol monoethyl ether and the like. It is desirable to have an alkaline substance present such as an alkali metal hydroxide, alkaline earth metal hydroxide, etc. We prefer to heat the reaction mixture for a period of from ½ hour to 4 hours at a temperature within the range of from 50° C. to 200° C.

After the reaction is complete the product can be obtained by diluting the reaction mixture with water followed by acidification. The product precipitates and can be recovered by filtration. It may then be purified by crystallization or other methods to obtain pure dehydroisoandrosteryl mercaptan, or the product can be treated with acetic anhydride, benzoyl chloride, etc. to produce the corresponding thioacetate, thiobenzoate, etc.

The compounds of the present invention are useful in the field of pharmaceuticals.

The invention will be described in greater detail in the following examples which illustrate the preferred method of preparing dehydroisoandrosteryl mercaptan and representative esters thereof.

Example 1

A mixture of 1.5 g. of dehydroisoandrosteryl p-toluenesulfonate (prepared according to Butenandt and Grosse, Ber. 69, 2776 (1936)), 3.1 g. of thiourea, 1.7 ml. of pyridine and 17 ml. of absolute ethanol is refluxed on the steam bath for 3 hours. Water is added, and the resulting turbid solution on being worked-up gives crystals. The mixture is cooled, and the crystals collected by filtration and washed with 25% ethanol. Recrystallization from methanol-acetone gives 1.2 g. of dehydroisoandrosteryl isothiuronium p-toluenesulfonate, melting point 254° C., decomp.

Five hundred and twenty milligrams of dehydroisoandrosteryl isothiuronium p-toluenesulfonate is treated with a solution of 0.12 g. of sodium hydroxide in 15 ml. of ethanol. The mixture is refluxed and the resulting turbid solution is treated with 1.1 ml. of water; the refluxing is continued for 2 hours. The reaction mixture is poured into ice water and the more or less turbid solution is acidified with glacial acetic acid. A finely divided precipitate results. The acidified mixture is allowed to stand for ½ hour, at which time the precipitate is collected by filtration. It is washed with a copious amount of water and is dried on a steam bath. Recrystallization from benzene-petroleum ether (boiling point 64°-66° C.) gives 0.23 g. of dehydroisoandrosteryl mercaptan, melting point 172.5° C.–174.5° C.

Example 2

A solution of 50 mg. of dehydroisoandrosteryl mercaptan in 2 ml. of pyridine is treated in the cold with 0.3 ml. of acetic anhydride. The mixture is allowed to stand at room temperature overnight, poured into ice water and acidified with cold dilute hydrochloric acid. The resulting crystals are separated and washed with a copious amount of water. Recrystallization from dilute methanol gave white needles of dehydroisoandrosteryl thioacetate having a melting point of 189°-189.5° C.

Example 3

A solution of 100 mg. of dehydroisoandrosteryl mercaptan in 3 ml. of pyridine is treated with ice cooling with 0.1 ml. of benzoyl chloride. The mixture is allowed to stand at room temperature for 2 days. Cold dilute hydrochloric acid is added, and the resulting precipitate is separated by filtration. It is washed successively with cold dilute hydrochloric acid, water and methanol. Recrystallization from a benzene-ethanol mixture gave 80 mg. of dehydroisoandrosteryl thiobenzoate having a melting point of 232°–234.5° C.

We claim:

1. Dehydroisoandrosteryl mercaptan.
2. A method of preparing dehydroisoandrosteryl mercaptan which comprises heating dehydroisoandrosteryl isothiuronium p-toluenesulfonate in ethanol in the presence of an alkali metal hydroxide and recovering said product therefrom.
3. A method of preparing dehydroisoandrosteryl mercaptan which comprises heating dehydroisoandrosteryl isothiuronium para-toluenesulfonate in a water miscible solvent under alkaline conditions and recovering said product therefrom.

SEYMOUR BERNSTEIN.
KARL J. SAX.

No references cited.